US008989705B1

(12) United States Patent
Katzer et al.

(10) Patent No.: US 8,989,705 B1
(45) Date of Patent: Mar. 24, 2015

(54) SECURE PLACEMENT OF CENTRALIZED MEDIA CONTROLLER APPLICATION IN MOBILE ACCESS TERMINAL

(75) Inventors: Robin D. Katzer, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 532 days.

(21) Appl. No.: 13/294,177

(22) Filed: Nov. 11, 2011

Related U.S. Application Data (63) Continuation-in-part of application No. 12/486,873, filed on Jun. 18, 2009.

(51) Int. Cl.
*H04W 12/06* (2009.01)

(52) U.S. Cl.
USPC .......................................... 455/411; 370/328

(58) Field of Classification Search
USPC ................... 370/328; 455/404.1, 411; 725/62
See application file for complete search history.

(56) References Cited

U.S. PATENT DOCUMENTS

| | | | |
|---|---|---|---|
| 5,303,378 A | 4/1994 | Cohen | |
| 6,131,024 A | 10/2000 | Boltz | |
| 6,219,712 B1 | 4/2001 | Mann et al. | |
| 6,668,322 B1 | 12/2003 | Wood et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,387,240 B2 | 6/2008 | Ziegler | |
| 7,552,467 B2 | 6/2009 | Lindsay | |
| 7,650,645 B1 | 1/2010 | Langendorf et al. | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,204,480 B1 | 6/2012 | Lindteigen et al. | |
| 8,238,823 B2 | 8/2012 | Maugars et al. | |
| 8,316,237 B1 | 11/2012 | Felsher et al. | |
| 8,402,543 B1 | 3/2013 | Ranjan et al. | |
| 8,413,229 B2 | 4/2013 | Mullick et al. | |

(Continued)

FOREIGN PATENT DOCUMENTS

WO WO2011025433 A1 3/2011
WO 2013170228 A2 11/2013

(Continued)

OTHER PUBLICATIONS

Notice of Allowance dated Nov. 29, 2013, U.S. Appl. No. 13/440,980, filed Apr. 5, 2012.

(Continued)

*Primary Examiner* — Myron K Wyche (57) ABSTRACT

A mobile access terminal (MAT) for use in an internet protocol multimedia system (IMS). The mobile access terminal comprises a first region of memory, a device application stored in the first region of memory, a second region of memory that implements a trusted security sector, and a centralized media controller application stored in the trusted security sector. The centralized media controller application is mated and paired with an incident internet protocol multimedia system network and wherein the centralized media controller application authenticates the device application and provides the device application with communications connectivity with the incident internet protocol multimedia system network.

20 Claims, 3 Drawing Sheets

(56) References Cited

U.S. PATENT DOCUMENTS

| | | | |
|---|---|---|---|
| 8,429,409 B1 | 4/2013 | Wall et al. | |
| 8,443,420 B2 | 5/2013 | Brown et al. | |
| 8,447,983 B1 | 5/2013 | Beck et al. | |
| 8,494,576 B1 | 7/2013 | Bye et al. | |
| 8,504,097 B1 | 8/2013 | Cope et al. | |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,667,607 B2 | 3/2014 | Paczkowski et al. | |
| 8,707,056 B2 | 4/2014 | Felton | |
| 8,712,407 B1 | 4/2014 | Cope et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,793,808 B2 | 7/2014 | Boccon-Gibod | |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,881,977 B1 | 11/2014 | Paczkowski et al. | |
| 2002/0095389 A1 | 7/2002 | Gaines | |
| 2002/0156911 A1 | 10/2002 | Croman et al. | |
| 2002/0174344 A1 | 11/2002 | Ting | |
| 2002/0181503 A1 | 12/2002 | Montgomery, Jr. | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0126225 A1 | 7/2003 | Camble et al. | |
| 2003/0237002 A1 | 12/2003 | Oishi et al. | |
| 2004/0158840 A1 | 8/2004 | Rothman et al. | |
| 2004/0202328 A1 | 10/2004 | Hara | |
| 2004/0233844 A1 | 11/2004 | Yu et al. | |
| 2004/0234049 A1 | 11/2004 | Melideo | |
| 2004/0243810 A1 | 12/2004 | Rindborg et al. | |
| 2005/0015601 A1 | 1/2005 | Tabi | |
| 2005/0052994 A1 | 3/2005 | Lee | |
| 2005/0091505 A1 | 4/2005 | Riley et al. | |
| 2005/0138433 A1 | 6/2005 | Linetsky | |
| 2005/0235166 A1 | 10/2005 | England et al. | |
| 2005/0239481 A1 | 10/2005 | Seligmann | |
| 2005/0289355 A1 | 12/2005 | Kitariev et al. | |
| 2006/0036851 A1 | 2/2006 | DeTreville | |
| 2006/0156026 A1 | 7/2006 | Utin | |
| 2006/0190605 A1 | 8/2006 | Franz et al. | |
| 2006/0212853 A1 | 9/2006 | Sutardja | |
| 2006/0224901 A1 | 10/2006 | Lowe | |
| 2006/0245438 A1 | 11/2006 | Sajassi et al. | |
| 2006/0259790 A1 | 11/2006 | Asokan et al. | |
| 2006/0261949 A1 | 11/2006 | Kim et al. | |
| 2006/0277307 A1 | 12/2006 | Bernardin et al. | |
| 2006/0277433 A1 | 12/2006 | Largman et al. | |
| 2007/0011061 A1 | 1/2007 | East | |
| 2007/0038648 A1 | 2/2007 | Chetwood et al. | |
| 2007/0061535 A1 | 3/2007 | Xu et al. | |
| 2007/0078988 A1 | 4/2007 | Miloushev et al. | |
| 2007/0079120 A1 | 4/2007 | Bade et al. | |
| 2007/0094273 A1 | 4/2007 | Fritsch et al. | |
| 2007/0094691 A1* | 4/2007 | Gazdzinski | 725/62 |
| 2007/0162759 A1 | 7/2007 | Buskey et al. | |
| 2007/0177771 A1 | 8/2007 | Tanaka et al. | |
| 2007/0180120 A1 | 8/2007 | Bainbridge et al. | |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0276969 A1 | 11/2007 | Bressy et al. | |
| 2007/0277223 A1 | 11/2007 | Datta et al. | |
| 2008/0014867 A1 | 1/2008 | Finn | |
| 2008/0022374 A1 | 1/2008 | Brown et al. | |
| 2008/0092213 A1 | 4/2008 | Wei et al. | |
| 2008/0097793 A1 | 4/2008 | Dicks et al. | |
| 2008/0121687 A1 | 5/2008 | Buhot | |
| 2008/0159129 A1 | 7/2008 | Songhurst et al. | |
| 2008/0159131 A1 | 7/2008 | Hoeflin et al. | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |
| 2008/0201578 A1 | 8/2008 | Drake | |
| 2008/0212503 A1 | 9/2008 | Lipford et al. | |
| 2008/0244758 A1 | 10/2008 | Sahita et al. | |
| 2009/0047923 A1 | 2/2009 | Jain et al. | |
| 2009/0055278 A1 | 2/2009 | Nemani | |
| 2009/0070272 A1 | 3/2009 | Jain | |
| 2009/0089449 A1 | 4/2009 | Day | |
| 2009/0113425 A1 | 4/2009 | Ports et al. | |
| 2009/0147958 A1 | 6/2009 | Calcaterra et al. | |
| 2009/0154348 A1 | 6/2009 | Newman | |
| 2009/0182634 A1 | 7/2009 | Park et al. | |
| 2009/0193491 A1 | 7/2009 | Rao | |
| 2009/0271321 A1 | 10/2009 | Stafford | |
| 2009/0281947 A1 | 11/2009 | Erel | |
| 2009/0300599 A1 | 12/2009 | Piotrowski | |
| 2009/0320028 A1 | 12/2009 | Gellerich et al. | |
| 2010/0031325 A1 | 2/2010 | Maigne et al. | |
| 2010/0052844 A1 | 3/2010 | Wesby | |
| 2010/0077487 A1 | 3/2010 | Travis et al. | |
| 2010/0082977 A1* | 4/2010 | Boyle et al. | 713/158 |
| 2010/0125904 A1 | 5/2010 | Nice et al. | |
| 2010/0128598 A1 | 5/2010 | Gandhewar et al. | |
| 2010/0130170 A1 | 5/2010 | Liu et al. | |
| 2010/0142517 A1 | 6/2010 | Montemurro et al. | |
| 2010/0146589 A1 | 6/2010 | Safa | |
| 2010/0153721 A1 | 6/2010 | Mellqvist | |
| 2010/0162028 A1 | 6/2010 | Frank et al. | |
| 2010/0198943 A1 | 8/2010 | Harrang et al. | |
| 2010/0223348 A1 | 9/2010 | Przybysz et al. | |
| 2010/0228937 A1 | 9/2010 | Bae et al. | |
| 2010/0241847 A1 | 9/2010 | van der Horst et al. | |
| 2010/0246818 A1 | 9/2010 | Yao | |
| 2010/0269156 A1 | 10/2010 | Hohlfeld et al. | |
| 2010/0274726 A1 | 10/2010 | Florek et al. | |
| 2010/0281139 A1 | 11/2010 | Deprun | |
| 2010/0299313 A1 | 11/2010 | Orsini et al. | |
| 2010/0306353 A1 | 12/2010 | Briscoe et al. | |
| 2010/0318802 A1 | 12/2010 | Balakrishnan | |
| 2010/0328064 A1 | 12/2010 | Rogel | |
| 2011/0010720 A1 | 1/2011 | Smith et al. | |
| 2011/0014948 A1 | 1/2011 | Yeh | |
| 2011/0021175 A1 | 1/2011 | Florek et al. | |
| 2011/0035604 A1 | 2/2011 | Habraken | |
| 2011/0055084 A1 | 3/2011 | Singh | |
| 2011/0078081 A1 | 3/2011 | Pirzadeh et al. | |
| 2011/0082711 A1 | 4/2011 | Poeze et al. | |
| 2011/0112968 A1 | 5/2011 | Florek et al. | |
| 2011/0113479 A1* | 5/2011 | Ganem | 726/9 |
| 2011/0154032 A1 | 6/2011 | Mauro, II | |
| 2011/0166883 A1 | 7/2011 | Palmer et al. | |
| 2011/0202916 A1 | 8/2011 | Voba et al. | |
| 2011/0212707 A1 | 9/2011 | Mahalal | |
| 2011/0216701 A1* | 9/2011 | Patel et al. | 370/328 |
| 2011/0226853 A1 | 9/2011 | Soh et al. | |
| 2011/0237190 A1 | 9/2011 | Jolivet | |
| 2011/0238573 A1 | 9/2011 | Varadarajan | |
| 2011/0238992 A1 | 9/2011 | Jancula et al. | |
| 2011/0246609 A1 | 10/2011 | Kim | |
| 2011/0251892 A1 | 10/2011 | Laracey | |
| 2011/0258462 A1 | 10/2011 | Robertson et al. | |
| 2011/0281558 A1 | 11/2011 | Winter | |
| 2011/0294418 A1 | 12/2011 | Chen | |
| 2012/0003983 A1 | 1/2012 | Sherlock et al. | |
| 2012/0011572 A1 | 1/2012 | Chew et al. | |
| 2012/0021683 A1 | 1/2012 | Ma et al. | |
| 2012/0023583 A1 | 1/2012 | Sallam | |
| 2012/0028575 A1 | 2/2012 | Chen et al. | |
| 2012/0029997 A1 | 2/2012 | Khan et al. | |
| 2012/0036347 A1 | 2/2012 | Swanson et al. | |
| 2012/0052801 A1 | 3/2012 | Kulkarni | |
| 2012/0072481 A1 | 3/2012 | Nandlall et al. | |
| 2012/0072979 A1 | 3/2012 | Cha et al. | |
| 2012/0084211 A1 | 4/2012 | Petrov et al. | |
| 2012/0084438 A1 | 4/2012 | Raleigh et al. | |

(56) References Cited

U.S. PATENT DOCUMENTS

| | | |
|---|---|---|
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0035056 A1* | 2/2013 | Prasad et al. ............... 455/404.1 |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0212704 A1 | 8/2013 | Shablygin et al. |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0345530 A1 | 12/2013 | McRoberts et al. |
| 2013/0347103 A1 | 12/2013 | Veteikis et al. |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0188738 A1 | 7/2014 | Huxham |
| 2014/0245444 A1 | 8/2014 | Lutas et al. |
| 2014/0281544 A1 | 9/2014 | Paczkowski et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Office Action dated Dec. 19, 2013, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

Cope, Warren B., et al., "Extended Trusted Security Zone Radio Modem", filed Nov. 26, 2013, U.S. Appl. No. 14/090,667.

Paczkowski, Lyle W., et al., "Trusted Security Zone Containers for the Protection and Confidentiality of Trusted Service Manager Data", filed Feb. 16, 2014, PCT Application No. PCT/US14/16651.

Foreign Communication from a Related Counterpart—International Search Report and Written Opinion, dated Dec. 2, 2013, PCT/US13/40673, filed on May 10, 2013.

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Search Report and Written Opinion, dated Feb. 4, 2014, PCT/US13/51750, filed on Jul. 24, 2013.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Cope, Warren B., et al., "Electronic Purchase Transaction Trust Infrastructure", filed May 29, 2012, U.S. Appl. No. 13/482,731.

Cope, Warren B., et al., "Alternative hardware and Software Configuration for Near Field Communication", filed May 4, 2012, U.S. Appl. No. 13/463,797.

Cope, Warren B., et al., "Multiple Secure Elements in Mobile Electronic Device with Near Field Communication Capability", filed Apr. 5, 2012, U.S. Appl. No. 13/440,980.

Bye, Stephen James, et al., "Near Field Communication Authentication and Validation to Access Corporate Data", filed May 3, 2012, U.S. Appl. No. 13/463,801.

(56) References Cited

OTHER PUBLICATIONS

Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed on Jun. 18, 2009.
Paczkowski, Lyle W., et al., "Trusted Security Zone Access to Peripheral Devices", filed Jan. 6, 2014, U.S. Appl. No. 14/148,714.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al., "Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.

(56) References Cited

OTHER PUBLICATIONS

Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Office Action dated Aug. 29, 2014, U.S. Appl. No. 13/470,203, filed May 11, 2012.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.

\* cited by examiner

SECURE PLACEMENT OF CENTRALIZED MEDIA CONTROLLER APPLICATION IN MOBILE ACCESS TERMINAL

CROSS-REFERENCE TO RELATED APPLICATIONS

This application is a continuation in part of U.S. patent application Ser. No. 12/486,873, filed Jun. 18, 2009, entitled "Mobile Access Terminal with Local Call Session Control Function," by Paczkowski, et al., which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile access terminals (MATs) are known in a wide variety of forms including mobile phones, personal digital assistants (PDAs), wireless enabled laptop computers, wireless enabled notebook computers, and others. As semiconductor technology advances, producing ever more powerful logic processors, and as wireless networks evolve to higher data throughput rates, the functionality that can be provided from mobile access terminals becomes more powerful. The internet protocol multimedia system (IMS) communications architecture has become a common core of the communications networks.

SUMMARY

In an embodiment, a mobile access terminal for use in an internet protocol multimedia system is disclosed. The mobile access terminal comprises a first region of memory, a device application stored in the first region of memory, a second region of memory that implements a trusted security sector, and a centralized media controller application stored in the trusted security sector. The centralized media controller application is mated and paired with an incident internet protocol multimedia system network and wherein the centralized media controller application authenticates the device application and provides the device application with communications connectivity with the incident internet protocol multimedia system network.

In an embodiment, a mobile access terminal for use in an internet protocol multimedia system is disclosed. The mobile access terminal comprises a first memory chip, a first device application stored in the first memory chip, a second memory chip that implements a trusted security sector, and a trust exchange service stored in the trusted security sector. The mobile access terminal further comprises a centralized media controller application stored in the trusted security sector, wherein the centralized media controller application is mated and paired with an incident internet protocol multimedia system network and wherein the centralized media controller application receives internet protocol multimedia system access client requests from the first device application via trust exchange service, authenticates the first device application, and provides the first device application with communications connectivity with the incident internet protocol multimedia system network.

A method of establishing a device to device wireless voice call is disclosed. The method comprises receiving a voice call origination request by a centralized media controller application, where the centralized media controller application executes in a trusted security sector of a first mobile access terminal, where the called party designated by the voice call origination request is a second mobile access terminal, wherein the first mobile access terminal is coupled to a micro network. The method further comprises determining by the centralized media controller application using the session initiation protocol (SIP) presence function that the second mobile access terminal is accessible in the micro network. The method further comprises establishing by the centralized media controller application a voice communication channel between the first mobile access terminal and the second mobile access terminal using wireless links provided by the micro network, wherein the wireless links do not involve a base transceiver station (BTS).

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a mobile access terminal (MAT) comprises a trusted security sector that is an execution and/or memory region providing enhanced security. The trusted security sector may interact with other applications and/or features executing and/or stored on the mobile access terminal, outside of the trusted security sector in what may be referred to as a permissive sector, via the mediation of a trust exchange service. For example, a centralized media controller application stored and executed in the trusted security sector of the mobile access terminal may provide a variety of communication network services to device applications executing in the permissive sector of the mobile access terminal that would normally be provided by communication servers located behind a firewall in a communication service provider network.

In an embodiment, the centralized media controller application provides internet protocol multimedia system (IMS)

proxy services. In an embodiment, the centralized media controller application may implement one or more extracted call session control function (CSCF) server applications that provides a reduced set of CSCF server functionality. The centralized media controller application may encapsulate highly confidential information that a service provider would not want to be readily hacked into by electronic criminals. By storing and executing the centralized media controller application in the trusted security sector, the vulnerability of the centralized media controller application to hacking or other security breaches is reduced.

In an embodiment, the mobile access terminal promotes a near field communication transceiver of the mobile access terminal engaging in session initiation protocol (SIP) message exchanges to establish new communication scenarios. For example, a mobile access terminal may download a door scanner application and associated credentials in preparation for visiting a new office. When the mobile access terminal is presented at the office building door scanner, the near field communication transceiver queries the door scanner application that was down loaded to the mobile access terminal to obtain electronic credentials, and then provides the needed electronic credentials to the office building door scanner to pass through the door. The door scanner application downloaded to the mobile access terminal, triggered by the interaction with the near field communication transceiver, sends a SIP invite message to the centralized media controller application on the mobile access terminal to retrieve media content via the macro cellular network, for example media content that provides graphical information for finding the correct floor and the correct room for a scheduled meeting. Additionally, the SIP invite message sent to the centralized media controller application on the mobile access terminal may request the centralized media controller application to establish a media stream to download documents related to a meeting to a laptop computer belonging to the user of the mobile access terminal.

As another example, the near field communication transceiver of the mobile access terminal may complete a payment transaction at a point-of-sale terminal, and the point-of-sale terminal may send a SIP invite via the macro cellular network to the centralized media controller application to play a video, for example a promotional message, on a display of the mobile access terminal while the payment transaction is completed.

In an embodiment, an extracted CSCF server application—which may be a component or portion of the centralized media controller application—may promote a user-to-user communication mode that unloads the macro cellular network. For example, in the presence of a femtocell, a calling application on a first mobile access terminal may attempt to originate a call to a second mobile access terminal, when both the first and second mobile access terminal are in the coverage of the femtocell. The extracted CSCF server application can send out a SIP invite message to the second mobile access terminal and determine that the second mobile access terminal is receiving coverage from the same femtocell that is providing coverage to the first mobile access terminal. In this case, the extracted CSCF server can set up the bearer channel to route the communication traffic between the two mobile access terminals directly through the femtocell—a device to device communication mode—and bypass the macro cellular network, thereby conserving the resources of the macro cellular network.

Figure 1:
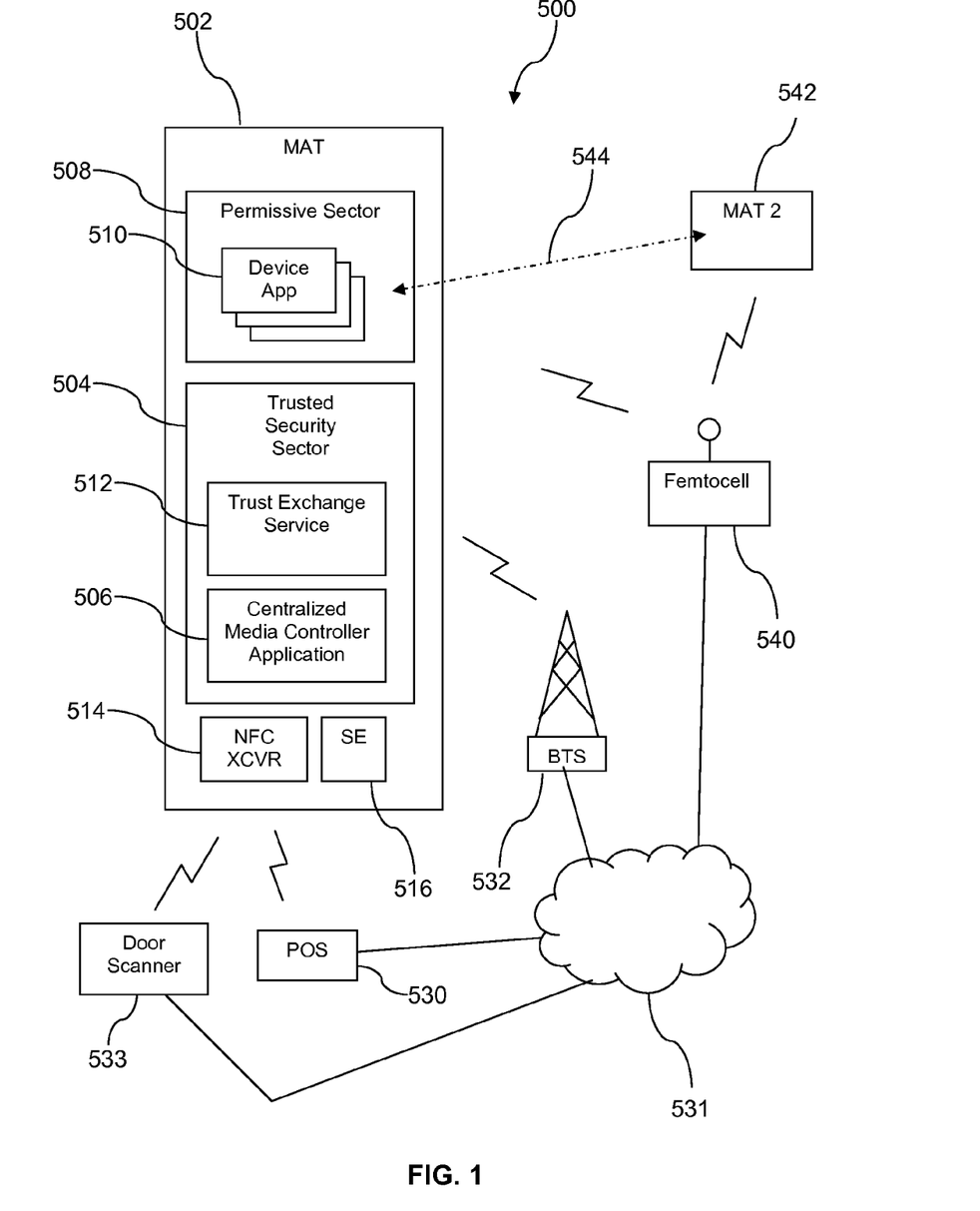
FIG. 1 illustrates a system according to an embodiment of the disclosure.

Turning now to FIG. 1, a communication system 500 is described. In an embodiment, the communication system 500 comprises a mobile access terminal 502 comprising a trusted security sector 504, a permissive sector 508, a near field communication transceiver 514, and a secure element 516. In an embodiment, the trusted security sector 504 comprises a centralized media controller application 506—for example an internet protocol multimedia system (IMS) call session control function (CSCF) server application. The permissive sector 508 comprises one or more device applications 510. The mobile access terminal 502 may engage in a variety of communication exchanges. The mobile access terminal 502 may comprise a variety of devices such as a mobile phone, a personal digital assistant (PDA), a media player, a laptop computer, a tablet computer, and other electronic devices having a macro cellular radio transceiver.

In an embodiment, the system 500 comprises a network 531. The network 531 may be a private network, a public network, or a combination thereof. The network 531 may promote voice communications and data communications. Portions of the network 531 may provide an IMS network. The mobile access terminal 502 may couple to the network 531 by a variety of communication paths. The mobile access terminal 502 may communicate with a base transceiver station 532 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. The wireless link between the mobile access terminal 502 and the base transceiver station 532 may couple the mobile access terminal 502 to the network 531.

In an embodiment, the mobile access terminal 502 may communicate with a point-of-sale (POS) terminal 530 using the near field communication transceiver 514 based on a short range wireless communication protocol, and the point-of-sale terminal 530 may couple the mobile access terminal 502 to the network 531. In an embodiment, the mobile access terminal 502 may communicate with a door scanner via the near field communication transceiver 514 based on a short range wireless communication protocol. In an embodiment, the mobile access terminal 502 may communicate with a femtocell 540 via a wireless link according to any of a variety of wireless protocols, including but not limited to code division multiple access (CDMA), long-term evolution (LTE), worldwide interoperability for microwave access (WiMAX), global system for mobile communications (GSM), or other wireless communication protocol.

In an embodiment, the femtocell 540 may couple the mobile access terminal 502 to a second mobile access terminal 542. In some contexts, this may be referred to as device-to-device communication, from the point of view that the traffic does not need to pass over the network 531. A femtocell, as known to those skilled in the art, may be a small cellular base station that may be designed for use in a home or small business. The femtocell provides wireless links, for example to mobile phones within its relatively small coverage area, according to standard cellular wireless protocols and couples these links, if needed, over a wired link to the core network or a service provider's network, for example the network 531. A femtocell, for example the femtocell 540, may be said to provide a micro cellular network to mobile access terminals within its small coverage area. The coverage area of base transceiver stations such as the base transceiver station 532 may be referred to as part of the macro cellular network. The femtocell 540 may extend cellular wireless coverage to dead zones or zones of poor macro cellular wireless coverage, for example to improve wireless coverage indoors. Some further details of communications scenarios enabled by loading the centralized media controller application 506 in the trusted security sector 504 and/or on the mobile access terminal 502 are discussed hereinafter.

As is known to those of skill in the art, a secure element (SE) may be a specialized semiconductor device and/or semiconductor chip that is designed to thwart attempts to reverse engineer the secure element or to physically slice and examine the secure element under a microscope. In an embodiment, the secure element 516 may be provided in a separate first memory chip. This semiconductor technology may be employed to store confidential information such as financial account balances, fund balances, and/or electronic money. The secure element 516 may allow only a limited number of applications to access the secure element 516 and/or may limit the functions that may be initiated by applications. In an embodiment, the near field communication transceiver 514 may be coupled to the secure element 516 to promote secure payment interactions between a fund stored in the secure element 516 and the point-of-sale terminal 530.

In an embodiment, the trusted security sector 504 may be provided in a secure area of a memory chip shared with the permissive sector 508 or in a separate memory chip. In an embodiment, the trusted security sector 504 may share the first memory chip with the secure element 516. Alternatively, the trusted security sector 504 may be provided in a separate second memory chip. The trusted security sector 504 may be provided as what may be conceptualized as "invisible space." In an embodiment, at least some of the memory addresses occupied by the trusted security sector 504 may be inaccessible to device applications 510 executing out of permissive sector 508. This demarcation of accessible memory addresses versus inaccessible memory addresses may be provided by the operating system of the mobile access terminal 502. In an embodiment, the trusted security sector 504 may encapsulate a trusted execution environment (TEE), for example conforming at least partially to the Global Platform 2.0 or later revision trusted execution environment standard. It is understood, however, that the trusted security sector 504 is contemplated to provide further functionality than that envisioned by the trusted execution environment standards.

In an embodiment, a trust exchange service 512 is provided in the trusted security sector 504. The trust exchange service 512 may be conceptualized as bridging between the permissive sector 508 and the trusted security sector 504. The trust exchange service 512 promotes secure interactions between the applications executing in the permissive sector 508 and applications executing in the trusted security sector. The security may be provided using one or more techniques. For example, the trust exchange service 512 may pause a plurality of execution threads when initiating an interaction with the trusted security sector 504, for example while handling a request for service from the centralized media controller application 506. This feature may reduce the opportunity that other threads may sniff of otherwise seek to intrude on the operation. For example, the trust exchange service 512 may impose a criteria that all communication between the permissive sector 508 and the trusted security sector 504 be conducted using data that is transformed according to protocols of the trusted security sector 504, for example using encryption and/or using hashing. The trust exchange service 512 may also hide address space in the trusted security sector 504 and/or make the address space inaccessible to the permissive sector 508 without the mediation of the trust exchange service 512.

In an embodiment, the trust exchange service 512 may be implemented in part as a session initiation protocol (SIP) back-to-back user agent (UA). A SIP back-to-back UA may comprise a first SIP user agent facing the device applications 510 and/or receiving client requests from the device applications 510. The SIP back-to-back UA further comprises a second SIP user agent facing the centralized media controller application 506 and transmitting allowed client requests to the centralized media controller application 506 that are forwarded to the second SIP user agent by the first SIP user agent. The first SIP user agent may act as a gate keeper to determine whether a client request may or may not be forwarded on to the second SIP user agent. In another embodiment, however, the trust exchange service 512 may not comprise a SIP back-to-back UA.

In an embodiment, the first SIP user agent of the SIP back-to-back UA provides a first interface that receives a first SIP request from the device application 510. The first SIP user agent reformulates the first SIP request as a second SIP request and sends the second SIP request to a second interface provided by the second SIP user agent of the SIP back-to-back UA. The second SIP user agent transmits the second SIP request to the centralized media controller application 506. The centralized media controller application 506 may then manage the SIP request to provide an IMS communication link for the requesting device application 510. By this sequence of actions, the SIP back-to-back UA protects the centralized media controller application 506 from the device application 510. If, for example, a malicious message was transmitted by the device application 510 to the SIP back-to-back UA, it is expected that the malicious message would be detected or corrected and the associated SIP request would not propagate through unchanged to the centralized media controller application 506. This functionality may be said to provide trusted SIP interactions between the device applications 510 and the centralized media controller application 506.

The device applications 510 may be any of a variety of applications. One of the device applications 510 may be a telephone application that receives dialed digits and attempts to originate a voice call—for example a voice over IP (VoIP) call—to a called telephone. One of the device applications 510 may be a web browser application that requests content from the network 531, for example by sending out a hypertext transport protocol (HTTP) message embedding a universal reference locator (URL). One of the device applications 510 may be a media player that requests streaming media from the network 531. In an embodiment, a building visit device application 510 may be temporarily installed and later removed or self-invalidated after a predefined duration of a visit. Such a building visit device application may support providing electronic credentials to access the building via a door scanner as well as supporting other visit services. Many of the device applications 510 may depend upon communication service provided by an IMS network to deliver their functionality to an end user of the mobile access terminal 502.

As is known to one skilled in the art, client requests for media and/or communication services delivered by an IMS network are typically received and handled by one or more call session control function (CSCF) servers. The CSCF servers may provide a variety of different functions and interwork with a large number of client media requests of different types or different scenarios. The CSCF functionality may be partitioned and distributed to a proxy-CSCF server, an interrogating-CSCF server, and a serving-CSCF server. These three servers may be provided as applications that each execute on different computers or computer systems. Alternatively, two or more of these servers may be provided as applications that execute on the same computer or computer system.

It is a teaching of the present disclosure that an extracted CSCF server application, the centralized media controller application 506, may be executed in the trusted security sector 504 of the mobile access terminal 502, thereby promoting a plurality of new communications scenarios. This can unload some of the processing of the CSCF servers in the network 531. This can reduce demand for network resources. This can reduce the latency experienced by device applications 510 when requesting communications services from the IMS network. This can promote ease of testing new device applications 510 and their interactions with the IMS network. The centralized media controller application 506 may provide some functionality of one or more of a proxy-CSCF server, an interrogating-CSCF server, and a serving-CSCF server. In an embodiment, a proxy-CSCF server application functionality of the centralized media controller application 506 may act as a proxy to the service provider IMS network proxy-CSCF server application.

An extracted CSCF server application provides a sub-set of the functionality provided by a full CSCF server application executing behind a firewall in a service provider's IMS core network. Using other words, an extracted CSCF server application provides reduced functionality with reference to a full CSCF server application executing behind a firewall in a service provider's IMS core network. When developing the firmware and/or software load for the mobile access terminal 502, a relatively small subset of the full-up functionality of a CSCF server application executing in the service provider's IMS network can be identified as sufficient to support the limited needs of the mobile access terminal 502.

In an embodiment, this subset of full-up CSCF server application functionality may be delivered as a library of software and/or firmware components. Because the centralized media controller application 506 encapsulates and provides an extract of the full-up IMS CSCF server applications that execute behind the service provider's firewall in their IMS core network, and because the centralized media controller application 506 receives client requests only from applications executing on the mobile access terminal 502, the authentication protocols used to access the IMS network may be changed. For example, the diameter protocol and/or the remote authentication dial in user service (RADIUS) protocol that provides an authorization, authentication, and accounting (AAA) framework may be modified for use by the extracted centralized media controller application 506. For example, the RADIUS protocols may comprise more than thirty different individual protocols that may be categorized into charging protocols, rating protocols, mediation protocols, etc.

By placing the centralized media controller application 506 in the trusted security sector 504, the centralized media controller application 506 may be protected from malicious attempts to discover privileged security information about the network 531, for example to reverse engineer some of the operating parameters and/or secure information used by CSCF server applications running in the service provider IMS network. In an embodiment, placing the centralized media controller application 506 in the trusted security sector 504 prevents or makes more difficult a hacker backwards manipulating the IMS network of a service provider via the centralized media controller application 506.

In an embodiment, the centralized media controller application 506 acts on behalf of a device application 510 to invite it to a SIP session and conducts authentication by proxy at the relatively high speed of chip instruction execution on the mobile access terminal 502 versus at the relatively low speed of performing the authentication over the network 531. The centralized media controller application 506 is mated and paired with an incident IMS network and provides communications connectivity, for example IMS communications connectivity, between the device applications 510 and the incident IMS network, for example at least a portion of network 531.

In an embodiment, the mobile access terminal 502 may be used to complete a purchase of goods or services via the point-of-sale terminal 530. The purchase may be effected by a communication between the near field communication transceiver 514 and the point-of-sale terminal 530 and may involve the secure element 516 transferring funds to pay for the goods or services, for example debiting a bank account associated with a user of the mobile access terminal 502 and mediating the transfer of those funds to a bank account associated with the point-of-sale terminal 530, for example a bank account associated with a grocery store. The near field communication transceiver 514 may receive a triggering signal from the point-of-sale terminal 530 during such a purchase transaction that indicates to the mobile access terminal 502 to expect a SIP invite message to arrive from the network 531. The near field communication transceiver 514 may pass this information or triggering signal on to the centralized media controller application 506 or to the SIP back-to-back UA 512.

The point-of-sale terminal 530 may transmit a message to a local area network to which it is coupled to cause some media content, for example a video clip, to be transmitted to the mobile access terminal 502 via a communications link that promotes higher bandwidth than that of the near field communication wireless link between the point-of-sale terminal 530 and the near field communication transceiver 514. This communication is effected via the IMS network portion of the network 531 by a SIP invite message being sent to the mobile access terminal 502 and to the centralized media controller application 506. Because the centralized media controller application 506 has been pre-notified to expect such a SIP invite message, the centralized media controller application 506 accepts the SIP invite message, and the video clip is transmitted to a suitable device application 510 which plays a video promotion on the display of the mobile access terminal 502 while the purchase of goods or services is being completed.

In an embodiment, the near field communication transceiver 514 may communicate with the door scanner 533 to provide secure credentials for accessing a building or a secure area. The mobile access terminal 502 may access a web site associated with a secured building in advance of a planned visit and download and install a device application 510 that is a door scanner application or provides functionality for visitors to the secure building. When the mobile access terminal 502 is presented at the door scanner 533, the near field communication transceiver 514 queries the device application 510 door scanner application that was downloaded to the mobile access terminal 502 to obtain electronic credentials, and then provides the needed electronic credentials to the door scanner 533 to pass through the door. The device application 510 door scanner application downloaded to the mobile access terminal 502, triggered by the interaction with the near field communication transceiver 514, sends a SIP invite message to the centralized media controller application 506 to retrieve media content via the macro cellular network and/or via the base transceiver station 532, for example media content that provides graphical information for finding the correct floor and the correct room for a scheduled meeting. Additionally, the SIP invite message sent to the centralized media controller application 506 may request the centralized media controller application 506 to establish a media stream to download documents related to a meeting to a laptop computer belonging to the user of the mobile access terminal 502.

In an embodiment, the device application 510 may originate a voice call to the second mobile access terminal 542. As part of this process, a SIP invite may be sent from the mobile access terminal 502 by the centralized media controller application 506 to the femtocell 540. The femtocell 540 is aware of the presence of the second mobile access terminal 542 and chooses to directly connect a voice channel between the mobile access terminal 502 and the second mobile access terminal 542, for example a VoIP channel. This may be referred to as a device-to-device communication link 544. This kind of new communication mode can save network resources, as it is not necessary for the femtocell 540 to create a link with the network 531 to couple the mobile access terminal 502 to the network 531 and it is not necessary for the femtocell 540 to create a link with the network 531 to couple the second mobile access terminal 542 to the network 531.

Figure 2:
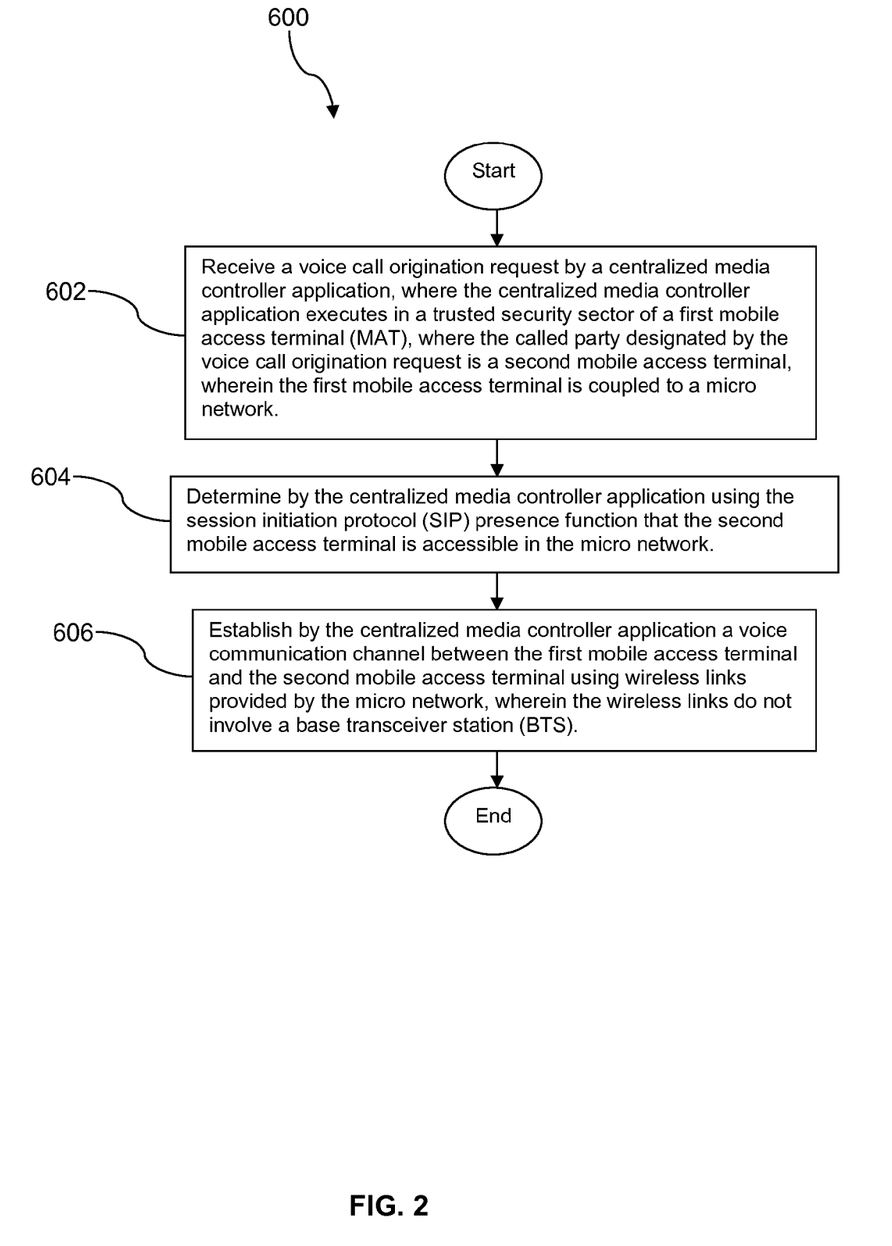
FIG. 2 illustrates a method according to an embodiment of the disclosure.

Turning now to FIG. 2, a method 600 is described. At block 602, a voice call origination request is received by centralized media controller application, where the centralized media controller application executes in a trusted security sector of a first mobile access terminal (MAT), where the called party designated by the voice call origination request is a second mobile access terminal, wherein the first mobile access terminal is coupled to a micro network. For example, in an embodiment, the device application 510, a phone application, sends a voice call origination request to the centralized media controller application 506, wherein the called party is designated in the message as the second mobile access terminal 542. The voice call origination request may be in the form of a SIP invite message. The micro network may be the wireless coverage provided by the femtocell 540. In an embodiment, the centralized media controller application 506 encapsulates and/or implements one or more call session control function application.

At block 604, the centralized media control application using the session initiation protocol (SIP) presence function determines that the second mobile access terminal is accessible in the micro network. For example, in an embodiment, the centralized media controller application 506 determines that the second mobile access terminal 542 is receiving wireless coverage from the femtocell 540. At block 606, the centralized media controller application establishes a voice communication channel between the first mobile access terminal and the second mobile access terminal using wireless links provided by the micro network, wherein the wireless links do not involve a base transceiver station. For example, in an embodiment, the centralized media controller application 506 establishes a voice communication bearer between the mobile access terminal 502 and the second mobile access terminal 542 via wireless links provided by the femtocell 540. The communication bearer may not comprise any communication links in the network 531 or between the femtocell 540 and the network 531.

Figure 3:
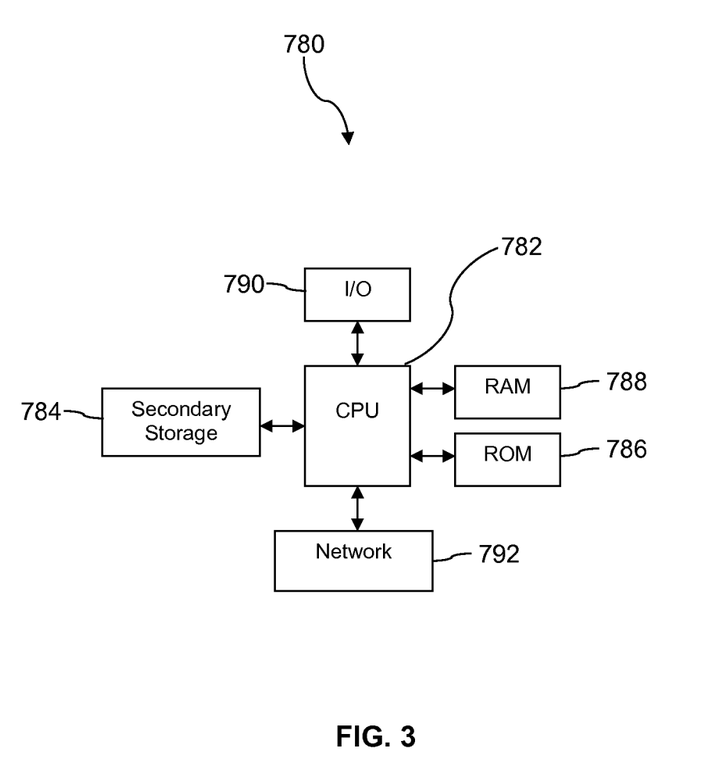
FIG. 3 illustrates a computer system suitable for implementing the aspects of an embodiment of the disclosure.

FIG. 3 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile access terminal for use in an internet protocol multimedia system, comprising:
a first region of memory;
a device application stored in the first region of memory;

a second region of memory that implements a trusted security sector; and,
a centralized media controller application stored in the trusted security sector that is mated and paired with an incident internet protocol multimedia system network, authenticates the device application by proxy rather than performing authentication over the incident internet protocol multimedia system network, and provides the device application with communications connectivity with the incident internet protocol multimedia system network, wherein the centralized media controller application stored in the trusted security sector of the mobile access terminal is an extracted call session control function server application that provides a sub-set of the functionality provided by a full call session control function server application executing in the incident internet protocol multimedia system network.

2. The mobile access terminal of claim 1, wherein the first region of memory is provided in a first memory chip and the second region of memory is provided in a second memory chip.

3. The mobile access terminal of claim 1, wherein the device application is a voice calling application, and wherein the centralized media controller application encapsulates a call session control function server application that provides device-to-device voice call set-up in response to a voice call origination request from the voice calling application.

4. The mobile access terminal of claim 1, wherein the centralized media controller application encapsulates a proxy call session control function server application.

5. The mobile access terminal of claim 4, wherein the proxy call session control function server application is an extract of a proxy call session control function server application executed by a call session control function server in the incident internet protocol multimedia system network.

6. The mobile access terminal of claim 5, wherein the proxy call session control function server application encapsulated by the centralized media control application executes reduced functionality remote authentication dial in user service functions.

7. A mobile access terminal for use in an internet protocol multimedia system, comprising:
a first memory chip;
a first device application stored in the first memory chip;
a second memory chip that implements a trusted security sector;
a trust exchange service stored in the trusted security sector; and
a centralized media controller application stored in the trusted security sector that is mated and paired with an incident internet protocol multimedia system network, receives internet protocol multimedia system access client requests from the first device application via the trust exchange service, authenticates the first device application by proxy rather than performing authentication over the incident internet protocol multimedia system network, and provides the first device application with communications connectivity with the incident internet protocol multimedia system network, wherein the centralized media controller application stored in the trusted security sector of the mobile access terminal is an extracted call session control function server application that provides a sub-set of the functionality provided by a full call session control function server application executing in the incident internet protocol multimedia system network.

8. The mobile access terminal of claim 7, wherein the trust exchange service encapsulates a session initiation protocol back-to-back user agent, wherein a first interface of the session initiation protocol back-to-back user agent receives a first session initiation protocol request from the first device application, the session initiation protocol back-to-back user agent reformulates the first session initiation protocol request as a second session initiation protocol request, and a second interface of the session initiation protocol back-to-back user agent transmits the second session initiation protocol request to the call session control function server application, whereby the session initiation protocol back-to-back user agent protects the call session control function server application from the first device application.

9. The mobile access terminal of claim 8, whereby the session initiation protocol back-to-back user agent provides trusted session initiation protocol interactions between the first device application and the call session control function server application.

10. The mobile access terminal of claim 7, wherein the centralized media controller application provides reduced functionality remote authentication dial in user service (RADIUS) functions for charging, rating, and mediation internet protocol multimedia system network operations.

11. The mobile access terminal of claim 7, further comprising a near field communication transceiver, wherein the centralized media controller application receives a trigger event from the near field communication transceiver and responds to receiving a session initiation protocol invite from an incident internet protocol multimedia system network based on the trigger event.

12. The mobile access terminal of claim 11, wherein the centralized media controller application responds to receiving the session invitation protocol invite by connecting a first media stream from the incident internet protocol multimedia system network to a second device application stored in the first memory chip.

13. The mobile access terminal of claim 11, wherein the centralized media controller application responds to receiving the session invitation protocol invite by connecting a second media stream from a third device application stored in the first memory to another mobile access terminal via the incident internet protocol multimedia system network.

14. The mobile access terminal of claim 7, wherein the trust exchange service pauses a plurality of execution threads of the mobile access terminal while handling one of the internet protocol multimedia system access client requests.

15. A method of establishing a device to device wireless voice call, comprising:
receiving a voice call origination request by a centralized media controller application executing in a trusted security sector of a first mobile access terminal, where the called party designated by the voice call origination request is a second mobile access terminal, wherein the first mobile access terminal is coupled to a micro network;
determining, by the centralized media controller application using the session initiation protocol (SIP) presence function, that the second mobile access terminal is accessible in the micro network; and
establishing, by the centralized media controller application, a voice communication channel between the first mobile access terminal and the second mobile access terminal using wireless links provided by the micro network, wherein the wireless links do not involve a base transceiver station.

16. The method of claim 15, wherein the voice communication channel comprises a first wireless link from the first mobile access terminal to a femtocell and a second wireless link from the femtocell to the second mobile access terminal.

17. The method of claim 16, wherein a voice traffic between the first mobile access terminal and the second mobile access terminal are not transmitted on a wired network.

18. The method of claim 15, wherein the centralized media controller application encapsulates a call session control function server application, wherein a dialer device application executing on the first mobile access terminal outside of the trusted security sector of the first mobile access terminal sends a session initiation protocol invite message to the call session control function server application, wherein the invite message designates the second mobile access terminal, wherein the receiving the voice call origination request comprises receiving the invite message by the call session control function server application.

19. The method of claim 18, wherein a session initiation protocol back-to-back user agent mediates between the dialer device application and the call session control function server application on the first mobile access terminal.

20. The method of claim 15, wherein the wireless links conform with the long-term evolution (LTE) wireless communication protocol.

* * * * *